United States Patent [19]

Huschle et al.

[11] 4,215,516
[45] Aug. 5, 1980

[54] UNIDIRECTIONAL TAPE

[75] Inventors: Robert J. Huschle; Sidney J. Roberts, both of Dennison, Minn.

[73] Assignee: Sheldahl, Inc., Northfield, Minn.

[21] Appl. No.: 31,180

[22] Filed: Apr. 18, 1979

Related U.S. Application Data

[63] Continuation of Ser. No. 849,270, Nov. 7, 1977, abandoned, which is a continuation of Ser. No. 732,100, Oct. 13, 1976, abandoned.

[51] Int. Cl.² ............................................. B24D 11/06
[52] U.S. Cl. ........................................ 51/399; 51/297; 156/304.3; 428/61
[58] Field of Search ................. 51/293, 297, 399, 381; 156/304; 428/58, 61

[56]  References Cited

U.S. PATENT DOCUMENTS

| | | | |
|---|---|---|---|
| 1,728,673 | 9/1929 | Driver | 51/399 |
| 2,391,731 | 12/1945 | Miller et al. | 51/399 |
| 2,733,181 | 1/1956 | Riedesel | 51/399 X |
| 3,154,897 | 11/1964 | Howard | 51/399 |
| 3,333,372 | 8/1967 | Gianatasio | 51/399 |
| 3,665,660 | 5/1972 | Malloy et al. | 51/399 |
| 3,729,873 | 5/1973 | Sandell | 51/399 |
| 3,763,604 | 10/1973 | Malloy | 51/399 |

FOREIGN PATENT DOCUMENTS 1209732  1/1966 Fed. Rep. of Germany ............. 428/58

*Primary Examiner*—Gary L. Smith
*Assistant Examiner*—Robert P. Olszewski
*Attorney, Agent, or Firm*—Orrin M. Haugen; Thomas J. Nikolai

[57]  ABSTRACT

A splicing system for the butt splicing of endless flexible abrasive belts which employs an adhesive having a multiplicity of unidirectionally oriented reinforcing fibers spanning the butt-joint to form a durable long lasting splice. The fibers which are embedded in a cohesive member form a reinforcement strip which is bonded to the abrasive belt surface. The fibers are high-modulus organic fibers, preferably having a tensile modulus in excess of about $15 \times 10^6$ psi, and with a tensile strength in excess of 200,000 psi.

1 Claim, 6 Drawing Figures

U.S. Patent      Aug. 5, 1980      4,215,516
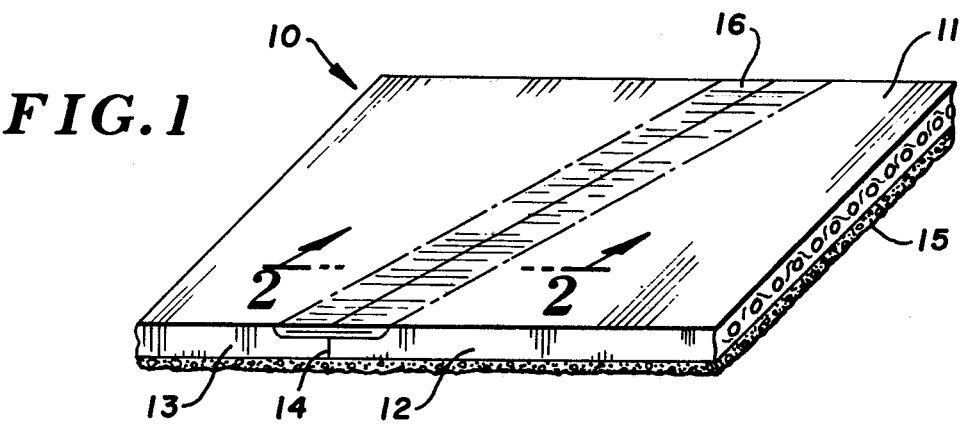
*FIG. 1*
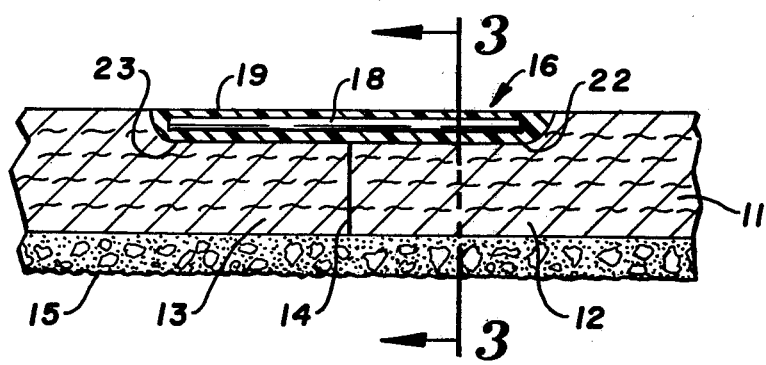
*FIG. 2*
*FIG. 3*
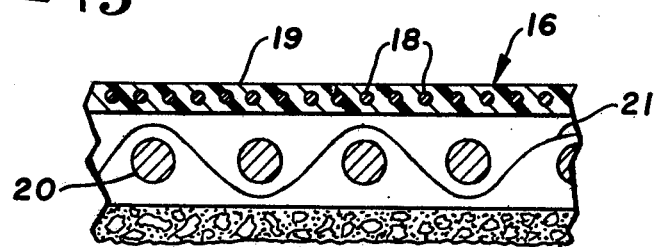
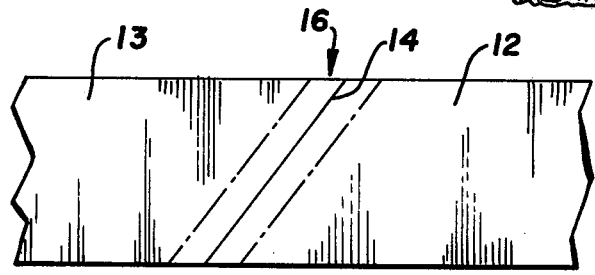
*FIG. 4*
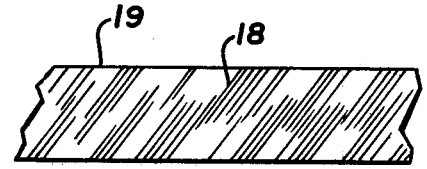
*FIG. 5*
*FIG. 6*
```
PREPARE BUTT JOINT
        ↓
RELIEVE SURFACE ZONES
   IN SPLICE AREA
        ↓
SPLICING MATERIALS IN PLACE → CURE SPLICING MATERIALS
```

UNIDIRECTIONAL TAPE

This is a continuation of application Ser. No. 849,270, filed Nov. 7, 1977, which, in turn, was a continuation of application Ser. No. 732,100 filed Oct. 13, 1976, both now abandoned.

BACKGROUND OF THE INVENTION

The present invention relates generally to an improved endless flexible abrasive belt, and more particularly to an improved means for splicing the belt along a butt joint formed in the structure. The splicing system has been found to be extremely durable, and resistant to both tensile and peel failure. For most of the materials employed as backing sheets for abrasive belts, it has been found that the splicing system of the present invention provides a cohesive strength which exceeds that of the backing sheet, thus providing a system wherein belt failures normally occur in areas other than in the splice.

In abrasive belts, butt splices are preferred in order to permit the endless belt to be driven in either axial direction. Butt splices typically have been made utilizing strips of a woven backing sheet having a parallelogram form, wherein the splice is formed along a bias direction. Typically, the edges of the backing material are abutted together, and thereafter joined together with a reinforcing strip which is bonded to the underside of the abrasive belt. Typically, the butt joints which have been utilized for flexible abrasive belts in the past have possessed substantial thickness dimensions, thereby forming a belt having a thickness which is greater at the splice than elsewhere.

Another technique which has been employed to form an endless flexible abrasive belt has been to form a tube of woven fabric by sewing a seam across a double thickness of the fabric. This technique presents problems in that the sewn seam creates a material build-up which adds significant thickness to the belt, thereby adversely affecting accuracy during abrasive machining or abrasive planing of various workpieces. Furthermore, in a joint of this kind, the abrasive belt had a requisite machine direction for usage, this tending to detract from the versatility, utility, and ultimate value of the product.

For many operations where uniformity is desired, and wherein bumping or thumping of the belt is deemed undesirable, any increased thickness in the area of the splice is a definite disadvantage, since the degree of accuracy available in an abrasive grinding or abrasive planing operation may be significantly reduced, and furthermore the durability of the abrasive belt will be adversely affected.

In preparing the splicing material for use in connection with the present invention, it is desired that a multiplicity of fibers be provided which span the butt joint present in the belt. These fibers are disposed generally parallel, one to another, and are oriented generally parallel to the central axis of the abrasive belt. Furthermore, the fibers are free of transverse fibers, thereby improving or otherwise enhancing the strength of the splice, without adversely affecting or unnecessarily increasing the thickness. In this connection, therefore, the fibers used to provide reinforcement in the splice extend generally in the machine direction, that is, generally along or parallel to the axis of the belt. The splicing material is preferably pre-formed in order that the angular bias present in the splicing material will be substantially the same as that used for the angular bias of the ends of the parallelogram used to form the endless belt. It will be appreciated, of course, that the reinforcing fibers need not be arranged along an axis which is precisely parallel to that of the abrasive belt, it being appreciated that certain axial deviations may be utilized with good results.

While adhesive tapes have been employed in the past for the preparation of butt-splices in abrasive belts, these tapes have normally employed a woven fabric having both machine direction and transverse direction fibers. In other words, the fibers are normally present in the splice in both axial and transverse directions. In other applications, randomly oriented fibers have been employed to form the fabric portion of the splicing material. Both of these techniques suffer from the disadvantage of having the thickness of the belt increased to an undesirable extent, particularly in the area of the splice.

In accordance with one aspect of the present invention, it has been found that long lengths of usable tape may be prepared for replacing the sewn seam or multidirectional fibers reinforcements used in the past. The tape is prepared by laminating reinforcing fibers along a certain orientation to an adhesive material, and thereafter forming a spirally wound tube with a preferred angular bias for the fibers. As an alternate preparation technique, the tape material may be wound on a straight tube and thereafter bias-slit so as to form the tape material having the fibers arranged in an appropriate angular bias. For convenience in use and application, a film or foil may be used as a backing member to assist in processing, with the film or foil being optionally removed following completion of the formation of the splice.

In order to still further reduce the extent to which the belt thickness is increased in the area of the splice, the edges of the area in the belt forming the splice are preferably relieved in order to permit the splicing material to be inset. This removal of material, when undertaken, can be accomplished by any suitable means such as grinding or the like, and is done in order to permit the splicing material to be positioned along the belt without adversely affecting the thickness by adding significant dimensions to the belt in the area of the splice. In certain instances, however, removal of material is not essential.

Therefore, it is a primary object of the present invention to provide an improved splicing system for an abrasive belt, wherein a multiplicity of reinforcing fibers are laminated or otherwise retained within an adhesive member to be secured to the areas of the belt adjacent the butt splice, and wherein the axis of the individual fibers are arranged generally parallel one to another, and preferably along an axial direction which is generally parallel to the machine axis of the belt.

It is a further object of the present invention to provide an improved splicing system to prepare butt splices in endless abrasive belts, and wherein the splice is formed with an adhesive bond spanning the joint, and with a multiplicity of unidirectionally disposed fibers being present to reinforce the adhesive film, the fibers having an exceptionally high modulus and high tensile strength.

It is yet a further object of the present invention to provide an improved splicing system for abrasive belts, particularly for the preparation of butt joints in abrasive belts wherein the joint may be prepared without adversely affecting the thickness of the belt in the area of the splice.

Other and further objects of the present invention will become apparent to those skilled in the art upon a study of the following specification, appended claims, and accompanying drawing.

BRIEF DESCRIPTION OF THE DRAWING

FIG. 1 is a perspective view of a segment of an endless abrasive belt taken in the area of the splice, and illustrating the disposition of the abrasive material, the backing sheet, and the splicing material employed therewith;

FIG. 2 is a vertical sectional view taken along the line and in the direction of the arrows 2—2, and illustrating a segment of an abrasive belt adjacent a splice forming a butt joint therein FIG. 3 is a vertical sectional view taken along the line and in the direction of the arrows 3—3 of FIG. 2;

FIG. 4 is a plan view of the splice zone of the abrasive belt illustrated in FIG. 1;

FIG. 5 is a top plan view of a reinforcing tape which may be formed as a subassembly for forming the splice in the manner illustrated in FIGS. 1-4 hereinabove; and FIG. 6 is a block diagram illustrating typical steps which are undertaken in the preparation of a splice in accordance with the present invention.

DESCRIPTION OF THE PREFERRED EMBODIMENT

One of the problems encountered in the selection of high modulus and high tensile strength organic fibers is that in certain applications, these fibers have poor compressive qualities. Specifically, when the individual fibers cross each other such as in a conventional weave, the relative motion which is set up between the fibers tends to cause abrasion to occur, with the abrasion ultimately destroying the integrity of the fibers, and thus permitting the splice to disintegrate. The utilization of a unidirectionally disposed fiber reinforcement permits the preparation of a splice which is exceptionally strong and durable, and which is resistant to self-destruction during use. Abrasive belts are typically extended between spaced apart parallel axis rollers, with the work normally being disposed at or adjacent one of the rollers, or alternatively in the zone located in the span between the rollers. In each instance, therefore, either tensile or compressive forces are encountered whenever the belt is caused to change its axial direction. Since belt motion may occur at speeds up to 20,000 feet per minute, the abrasion and self-destruction of woven fibers has been found to occur with resultant failure of the abrasive belt in the area of the splice.

In the preparation of the preferred embodiment of the present invention, a splice is formed in an abrasive belt in accordance with the following examples:

EXAMPLE 1

A high modulus organic fiber formed as a polymer of poly-p-benzamide and the polyterephthalamide of p-phenylenediamine, available from E. I. du Pont de Nemours & Company of Wilmington, Del. is laminated to a polyester adhesive. The adhesive is prepared from a mixture of linear saturated esters of sebacic and terephthalic acids and ethylene glycol modified with a cross linking agent such as polymethylene polyphenyl isocyanate, all of which will be described more fully hereinbelow. The Kevlar fibers are arranged at a quantity of 40 fibers per inch (perpendicular to the measured dimension) with the fibers being of 200 denier. The combined cross sectional thickness of the fiber-adhesive composite is 3 mils. The fiber-adhesive laminate is then backed with a film of stress-oriented polyethylene terephthalate having a thickness of 1 mil. Stress-oriented polyethylene terephthalate is available commercially from a number of sources, one of which is E. I. du Pont de Nemours & Company of Wilmington, Del. under the mark "Mylar".

The fiber-adhesive backing member is then wound in a straight tube and bias-slit so as to provide a film-backed reinforcing tape with the fibers being disposed at an angular bias of from 52° to 55° to the web axis. As an alternate, the material may be wound in a spiral tube and slit to provide bias-oriented fibers.

A strip of a woven backing sheet having an abrasive coating on one of the major surfaces thereof is selected, such as an abrasive material available from Carborundum Company of Niagara Fall, N.Y. under the designation Number 965, this material being a backing sheet of woven cotton to which abrasive grit has been applied. The ends of the parallelogram are cut at an angle of 52° from the central elongated axis, and the edges adjacent the ends are relieved on the underside thereof (on the surface opposite that to which the abrasive is applied), with the relief depth being approximately 1 mil.

The parallelogram strip is then formed in a tube, with the ends forming a butt joint, and with the film backed fiber reinforced adhesive being applied to the relieved area. The splice material is then pressed at a temperature of between approximately 225° F. and 300° F. for a period of 12 seconds under a force of approximately 2000 pounds per square inch. The tube is then in the form of an endless flexible abrasive belt having the butt joint and splice formed integrally therein. The strength of the splice has been found to exceed that of the backing material, with the splice having good wet and dry strength, exceptional peel strength, and sufficient flexibility so as to enhance the durability of the splice.

EXAMPLE 2

A high modulus organic fiber formed as a polymer of poly-p-benzamide and the polyterephthalamide of p-phenylenediamine, available from E. I. du Pont de Nemours & Company of Wilmington, Del. is laminated to a polyester adhesive. The adhesive is prepared from a mixture of linear saturated esters of sebacic and terephthalic acids and ethylene glycol modified with a cross linking agent such as polymethylene polyphenyl isocyanate, all of which will be described more fully hereinbelow. The Kevlar fibers are arranged at a quantity of 20 fibers per inch (perpendicular to the measured dimension) with the fibers being of 400 denier. The combined cross sectional thickness of the fiber-adhesive composite is 3 mils. The fiber-adhesive laminate is then backed with a film of stress-oriented polyethylene terephthalate having a thickness of 1 mil. Stress-oriented polyethylene terephthalate is available commercially from a number of sources, one of which is E. I. du Pont de Nemours & Company of Wilmington, Del. under the mark "Mylar".

The fiber-adhesive backing member is then wound in a spiral tube, and is slit so as to provide a film-backed reinforcing tape with the fibers being disposed at an angular bias of from 52° to 55° to the web axis. An equivalent technique is to wind the material on a straight tube and bias-slit the wound material.

A strip of a woven backing sheet having an abrasive coating on one of the major surfaces thereof is selected, such as an abrasive material available from Carborundum Company of Niagara Falls, N.Y. under the designation Number 965, this material being a backing sheet of woven cotton to which abrasive grit has been applied. The ends of the parallelogram are cut at an angle of 52° from the central elongated axis, and the edges adjacent the ends are relieved on the underside thereof (on the surface opposite that to which the abrasive is applied), with the relief depth being approximately 1 mil.

The parallelogram strip is then formed in a tube, with the ends forming a butt joint, and with the film backed fiber reinforced adhesive being applied to the relieved area. The splice material is then pressed at a temperature of approximately 225° F. to 300° F. for a period of 12 seconds under a force of approximately 2000 pounds per square inch. The tube is then in the form of an endless flexible abrasive belt having the butt joint and splice formed integrally therein. The strength of the splice has been found to exceed that of the backing material, with the splice having good wet and dry strength, exceptional peel strength, and sufficient flexibility so as to enhance the durability of the splice.

EXAMPLE 3

The procedure set forth in Example 1 was followed with the exception being that 30 fibers were laid down per inch, with the fibers being 300 denier.

EXAMPLE 4

The procedure set forth in Example 1 was repeated with the exception being that an adhesive comprising an imide-amide-polyester copolymer was used in lieu of the polyester adhesive. The copolymer was the same as that described in U.S. Pat. No. 3,505,272, John Gagliani, dated Apr. 7, 1970.

EXAMPLE 5

An adhesive belt was prepared according to the procedure set forth in claim 1, with the exception being that the adhesive selected was a commercially available adhesive consisting essentially of polyurethane. One such commercially available polyurethane is sold under the mark "Chemlok 7010" by Hughson Chemicals Lord Corp. of Erie, Pa.

EXAMPLE 6

An endless flexible abrasive belt was prepared pursuant to the procedure set forth in Example 1, with the exception of the substitution of a fiber for reinforcement, and with a certain polyamide fiber available commercially under the Trademark "Nomex" from E. I. du Pont de Nemours & Company of Wilmington, Del. This material is a polyamide material similar to nylon but having higher modulus and tensile strength, and further having higher temperature capabilities.

EXAMPLE 7

An endless flexible abrasive belt was prepared according to the procedure set forth in Example 1, with the exception being that fibers fabricated from polyethylene terephthalate were substituted for the Kevlar fibers of Example 1. Fibers consisting essentially of polyethylene terephthalate are available commercially under the Trademark "Dacron" by E. I. du Pont de Nemours & Company of Wilmington, Del.

THE FIBER REINFORCEMENT

It will be appreciated that the most important single component in the splicing materials is the high-modulus organic fibers employed. As has been indicated, these fibers are commercially available and a variety of such fibers may be successfully utilized.

High-modulus fibers are typically those possessing high resistance to elongation under stress. High-modulus organic fibers can be generally described as those possessing a tensile modulus greater than about 600 grams per denier, or generally, a tensile strength in excess of 200,000 psi.

One such fiber is the polymer of poly-p-benzamide and the polyterephthalamide of p-phenylenediamine. Such materials are available commercially from E. I. du Pont de Nemours & Company under the Trademark "Kevlar". Another such high-modulus organic fiber is available from Monsanto Chemical Co. of St. Louis, Mo. under the code designation X-500. Such a product utilized para-oriented phenylene moieties in the polymer. It has been found that these materials produce a high-melting polymer resistant to most solvents, producing fibers with an unusually high modulus.

High modulus fibers may be prepared from the copolyterephthalamide of a 90:10 molecular base mixture of 4, 4'-diaminobenzanilide and p-aminobenzhydrazide. Such fibers have been found to have a modulus of 698 grams per denier. A similar copolymer is available in which the aminobenzhydrazide is replaced with p-phenylene-2, 2'-bis (5-aminobenzoxazole), in which a fiber is produced with a modulus up to 793 grams per denier. A variety of such fibers are described in Chemical & Engineering News, Apr. 17, 1972, pages 33–34.

As has been indicated, other fibers such as Nomex and Dacron fibers may be employed, along with certain nylon fibers. The nylon fibers are preferably selected from those nylon alloys or formulations producing fibers having a tensile modulus in excess of about $15 \times 10^6$ psi, and a tensile strength in excess of about 200,000 psi.

ADHESIVES

The preferred adhesive is preferably prepared from a mixture of linear saturated esters of sebacic and terephthalic acids, the dibasic alcohol employed in the reaction mixture preferably being ethylene glycol. These adhesives are, of course, commercially available. Various modifying ingredients may also be employed, such as certain aromatic bicarboxylic acids such as isophthalic acid. The melting point of the 50:50 mixture of sebacic and terephthalic acids esterified with ehtylene glycol is 270° F.

To this adhesive system, there is added between about 8% and 10% by weight of polymethylene polyphenyl isocyanate, based on resin solids. The solvent employed is preferably a mixture of methylene chloride and 1,1,2-trichloroethane. The solvent system permits the formation of a laminate of reinforcing fibers and cross-linked polyester capable of being worked on a hot-roll laminator.

BACKING FILM

As has been indicated, a backing film may be employed in order to enhance handling and processing. The backing material may be either a film, a foil, or release paper. Woven or spun bonded fabric may also be advantageously employed as a backing material. One which has been found useful is 1 mil stress-oriented polyethylene terephthalate, which has low tear strength, thereby rendering the backing material of little beneficial effect following completion of the belt. It is normally desired that the backing material be compatible with the sealing equipment utilized, thereby assisting in the handling.

PRE-TREATMENT OF WOVEN BACKING SHEET

In order to assist in bonding of the material to the woven fabric, it is sometimes desirable to prime the fabric with a compatible adhesive. Priming is particularly desirable for bond enhancement, and may be particularly desirable when the surface of the material has been skived. Such priming is not always required, since certain adhesive systems and combinations may be utilized advantageously without priming or other pre-treatment.

Furthermore, it will be appreciated that skiving or removal of material from the woven fabric may not always be required. In certain applications, the condition and thickness of the woven material may render the skiving operation unnecessary. As has been indicated, however, greater degrees of reduction of thickness may be accomplished when the skiving operation is included.

APPLICATION OF SPLICE MATERIAL TO BELT

As has been indicated, a bar sealer may be employed to bond the splicing material to the surface of the belt. Thermal impulse sealing techniques may be employed as well. Also, as has been indicated, the surface of the woven backing sheet is preferably ground away so as to remove any undesirable adhesive film, and thereby exposing the bare cloth. Primer, heat and temperature along with pressure applied to the material for a proper-period of time are utilized in order to achieve a proper bond between the splicing material and the surface of the woven backing sheet.

Following sealing, it has been found that a splice having a thickness of 3 mils for the fiber-adhesive portion, and 1 mil for the backing material may add only about 1 mil to the overall belt thickness. If the backing material is removed, of course, the added dimension would be correspondingly decreased.

DESCRIPTION OF THE FINISHED PRODUCT

Attention is now directed to the drawing wherein an adhesive belt is shown generally at 10 in FIG. 1, with the belt consisting of a woven backing sheet 11 having end zones as at 12 and 13. As appreciated, the woven backing sheet is cut in the form of a parallelogram strip, thus producing the ends 12 and 13 respectively. A butt joint is shown at 14 which is the juncture point between ends 12 and 13 in the tubular configuration thereby formed. A layer or coating of abrasive grit is shown at 15, with the abrasive grit being applied to one major surface of the belt. A splice is formed in the area of the butt joint, such as shown at 16, the splice being shown and described in greater detail hereinafter.

With attention now being directed to FIG. 2, it will be observed that the splice 16 consists of a plurality of fibers 18 which are embedded in an adhesive coating or strip 19. The individual fibers 18—18 thereby span the butt joint 14, which is formed between the edges of the woven fabric 11. In FIG. 3, it will be observed that the fibers 18—18 are superimposed over the woven fabric, the woven fabric consisting of fibers 20—20 extending in the web direction, and fibers 21—21 extending in the transverse direction.

With attention being again directed to FIG. 2, it will be observed that relief areas or zones are provided as at 22 and 23, with these relieved areas being provided in order to reduce the overall increase in thickness experienced when the splicing material is attached.

Attention is now directed to FIG. 6 of the drawing wherein the block diagram illustrates the various steps in the operation of preparing a flexible abrasive belt in accordance with the present invention. Specifically, the butt joint is originally prepared with the surface zones adjacent the splice area being relieved. Thereafter, the splicing materials are set in place and a bar sealer is pressed against the splicing material so as to cause the adhesive material to fuse and flow into the woven backing sheet.

It has been indicated that the abrasive belt is cut on a bias, such as a 52° bias. It will be appreciated, of course, that other angular bias arrangements may be employed, such as in the area of between about 45° and 70°. The utilization of the bias cut minimizes or reduces any bumping or thumping which may occur upon passage of the splice area over the idler or drive rollers, as well as when the splice area may otherwise pass over the surface of the work.

We claim:
1. An endless flexible abrasive belt comprising a parallelogram strip of a woven backing sheet spliced to an endless belt along a butt joint formed therein and having opposed major surfaces with a coating of abrasive grit applied to one of said major surfaces and with a splicing means secured to the other of said major surface and spanning said butt joint, said splicing means comprising:
   (a) a fiber reinforced composite strip member consisting of a cohesive member bonded to said major surface and having a multiplicity of fibers spanning said butt joint, said fibers being disposed generally parallel, one to another, and with the fibers of said strip member having their axes oriented generally parallel to the central axis of said endless belt and being free of transverse fibers;
   (b) each of said fibers being a polymer of poly-p-benzamide and the polyterephthalamide of p-phenylenediamine and having a tensile modulus of about 200 grams per denier, with said fibers being arranged at a quantity of 40 fibers per inch perpendicular to the measured direction;
   (c) said fibers being laminated to a polyester adhesive; and
   (d) said fiber-adhesive having a backing member bonded thereto, said backing member consisting essentially of a film of stress-oriented polyethylene terephthalate having a thickness of 1 mil.

* * * * *